M. BOUCHET.
TRANSMISSION MECHANISM.
APPLICATION FILED JUNE 8, 1906.

914,108.

Patented Mar. 2, 1909.

WITNESSES:
W. M. Avery
Alfred P. Martin

INVENTOR
Maurice Bouchet
BY
ATTORNEYS

UNITED STATES PATENT OFFICE.

MAURICE BOUCHET, OF PARIS, FRANCE.

TRANSMISSION MECHANISM.

No. 914,108.  Specification of Letters Patent.  Patented March 2, 1909.

Application filed June 8, 1906. Serial No. 320,739.

*To all whom it may concern:*

Be it known that I, MAURICE BOUCHET, of 22 Rue Alphonse de Neuville, in the city of Paris, Republic of France, engineer, have invented a Transmission Mechanism, of which the following is a full, clear, and exact description.

The object of the present invention is a transmission movement, automatically modifying the speed of the driven member according to the force to be overcome, and serving at the same time to limit the transmitting force.

The invention is characterized essentially by the fact that the driving movement is transmitted through a pinion whose axis is supported by a lever pivoted by one end, and having its free end acted upon by a spring counterbalancing the tangential force on the teeth of the pinion, the pinion having a clutch connection with the mechanism connected with the driven shaft for operating the same, thus constraining the driven shaft to turn in the same direction. This arrangement causes the automatic regulation of the transmission movement of the motor, when the driving force exceeds a certain value by permitting the pinion to take a position which limits automatically the speed of such movement, or even annuls it if the resistance becomes too strong.

Figure 1:
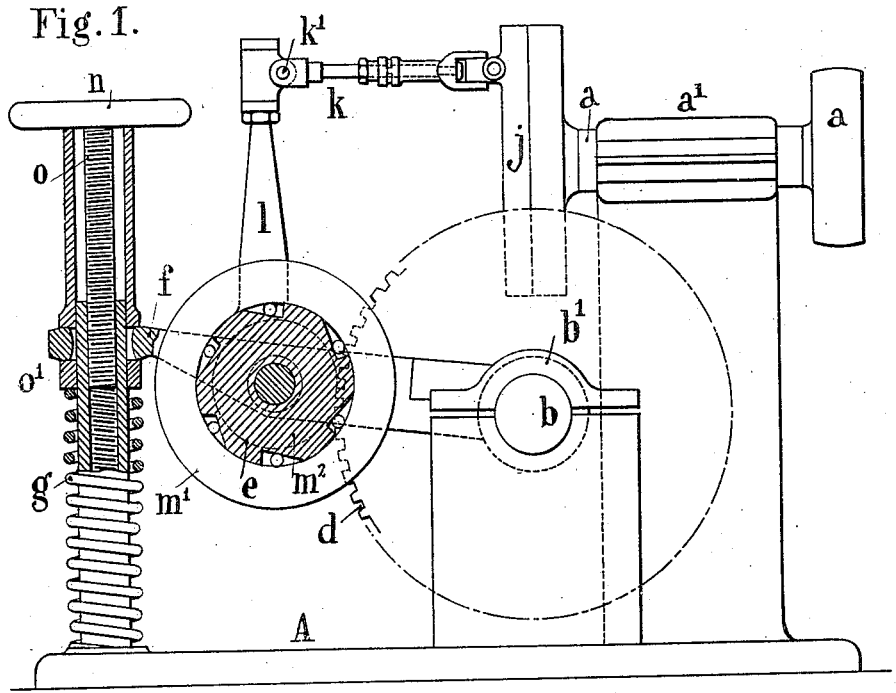
Figure 2:
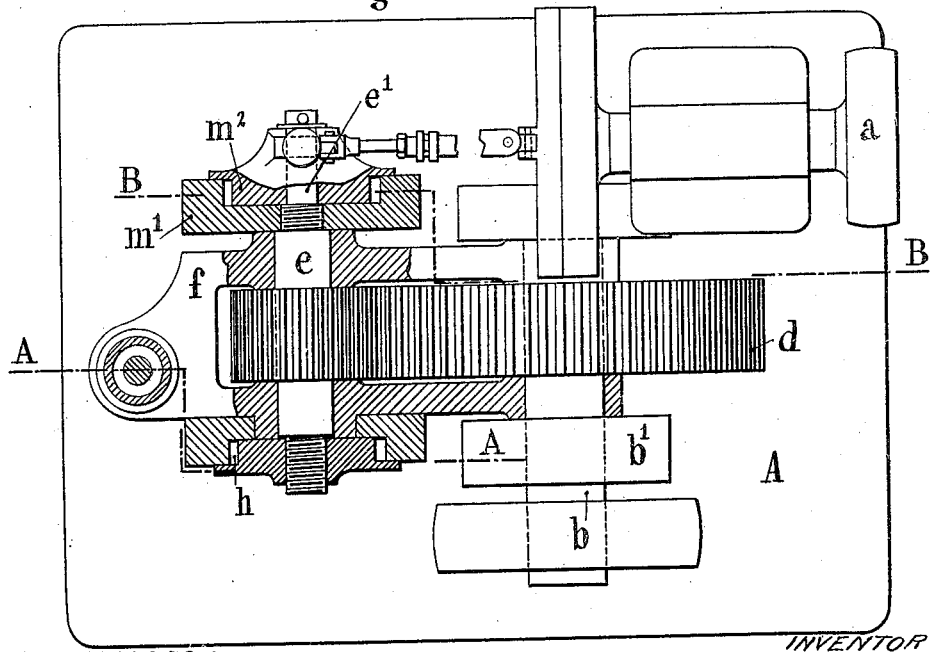

In the drawings—Figure 1 is a sectional side view on the line A—A of Fig. 2. Fig. 2 is a plan view.

The driving shaft $a$, is journaled in suitable bearings $a'$ on the frame A, and is provided at one end with a pulley $a^2$ which may be connected with a suitable source of power, and at the other end with a disk $j$ having connected with the outer face near the periphery thereof by means of a universal joint, a link $k$. The opposite end of the link $k$ is connected by a universal joint $k'$ to an arm $l$ loosely journaled on a shaft $e'$, mounted in a lever $f$, one end of the lever being journaled on the driven shaft $b$ and the other end supported in a manner to be hereinafter described. The driven shaft $b$ is journaled in suitable bearings $b'$ on the frame A, and is provided with a gear wheel $d$ meshing with a pinion $e$ secured to the shaft $e'$ before described.

An arm $l$, is provided with a cylindrical projection concentric with the shaft $e'$, and the periphery of the cylindrical projection is provided with inclined notches containing rollers as shown in Fig. 1 and fits within a circular recess in a wheel $m'$ secured to the shaft $e'$, the wheel $m'$ and the cylindrical projection $m^2$ thus forming a clutch for connecting the arm $l$ with the shaft $e'$ when the arm is moved in one direction. A similar clutch $h$ is arranged on the opposite end of the shaft for preventing movement of the shaft in the opposite direction.

The free end of the lever $f$ is provided with an opening encircling a standard secured to the frame A, and having in the upper end thereof a threaded socket $o'$ in which is received a screw $o$ having on the upper end thereof a hand wheel $n$. The hand wheel is provided with a sleeve encircling the screw and the standard and engaging the upper face of the lever, the lower face being supported by a spring $g$. It is evident that when the hand wheel is turned to lower the screw, the free end of the lever will be moved downward against the resistance of the spring.

The movement of rotation of the shaft $a$ is transformed by the disk $j$ and the link $k$, into a vibratory movement of the arm $l$, and this vibratory movement is transformed by the clutches into a rotary movement of the shaft $e'$ in one direction, which is transmitted to the driven shaft through the pinion $e$ and gear wheel $d$.

The lever $f$ takes a position of equilibrium between the force of the spring and the force exerted on the teeth of the pinion $e$, in such manner that when the force exerted upon the teeth of the pinion $e$ is greater than that upon the spring $g$, the end of the lever will be depressed thus lowering the joint $k'$ of the link $k$ and bringing it more nearly toward the center of the disk $j$. It will be evident that the nearer the joint $k'$ approaches the axis of the disk $j$ the less will be the vibration of the arm $l$, since the amplitude of movement of the arm $l$ depends on the position of this joint $k'$. From this results, that according to the position of the lever $f$, the speed of transmission will be modified according to the force to be transmitted.

When the force of resistance attains a determined value, the lever $f$ will take a position such that the joint $k'$ will lie in the prolongation of the axis of the shaft $a$, in which position the transmitted force is nullified although the motor may continue to turn. If the force of resistance begins to diminish the lever is acted upon by the spring $g$ and takes a new position of equilibrium, moving the joint $k'$ away from the axis of the shaft $a$, and the vibration of the arm $l$ will recommence. By means of the wheel $n$ and the screw $o$, it is possible to regulate the position of the lever $f$ manually, and independently of the conditions before stated.

The above arrangement is especially applicable, in cases where the resisting force varies constantly and wherein the force transmitted must not exceed a certain limit, for example, in hydraulic presses where the pressure increases in proportion to the action of the piston. By making use of the above device, the pump acts with a speed inversely proportional to the pressure, while utilizing completely the power of the motor; and in addition when the desired pressure is attained the pump stops automatically. The device is also especially applicable to automobiles, and in an automobile provided with the device, the speed of the vehicle will be inversely proportional to the resistance to be overcome.

I claim—

1. In a power transmission device, the combination with the driven shaft, a gear wheel secured thereto, a lever journaled on the driven shaft, a pinion mounted on the lever and meshing with the gear wheel, a counterbalance for the end of the lever, a driving shaft, a disk on the end of the driving shaft, an arm pivoted coaxially with the pinion, a link having a universal connection with the free end of the arm and with the face of the disk near the periphery thereof, and a clutch connection between the arm and the pinion.

2. In a power transmission device, the combination with the driven shaft, a gear wheel secured thereto, a lever journaled on the driven shaft, a pinion on the lever and meshing with the gear wheel, a driving shaft, a disk on the end of the driving shaft, an arm pivoted coaxially with the pinion, a link having a universal connection with the free end of the arm and with the face of the disk near the periphery thereof, a clutch connection between the arm and the pinion, a spring supporting the free end of the lever, and means for adjusting the tension of the spring.

3. In a power transmitting device, the combination with the driven shaft, a gear wheel secured thereto, a lever journaled on the driven shaft, a pinion mounted on the lever and meshing with the gear wheel, a driving shaft, a disk on the end of the driving shaft, an arm pivoted coaxially with the pinion, a link having a universal connection with the free end of the arm and with the face of the disk near the periphery thereof, a clutch connection between the arm and the pinion whereby to connect the arm to the pinion during the forward movement thereof, and means for preventing movement of the pinion in a reverse direction.

4. In a power transmission device, the combination with the driven shaft, a gear wheel secured thereto, a lever journaled on the driven shaft, a pinion mounted on the lever and meshing with the gear wheel, a driving shaft, means connecting the driving shaft and the pinion for moving said pinion intermittently in one direction, and a counterbalance on the free end of the lever.

5. In a power transmission device, the combination of a lever turning around a fixed point, a counterbalance connected with the free end of the lever, a pinion carried by the lever, means for rotating the pinion intermittently in one direction, and means for preventing rotation of the pinion in the opposite direction.

The foregoing specification of my mechanism for transmitting movement with variable speed and direction signed by me this 29th day of May, 1906.

MAURICE BOUCHET.

Witnesses:
MAURICE H. PIGNET,
HANSON C. COXE.